No. 820,691. PATENTED MAY 15, 1906.
G. ADAMS.
TRACTION ATTACHMENT FOR AUTOMOBILE WHEELS.
APPLICATION FILED JAN. 26, 1905.
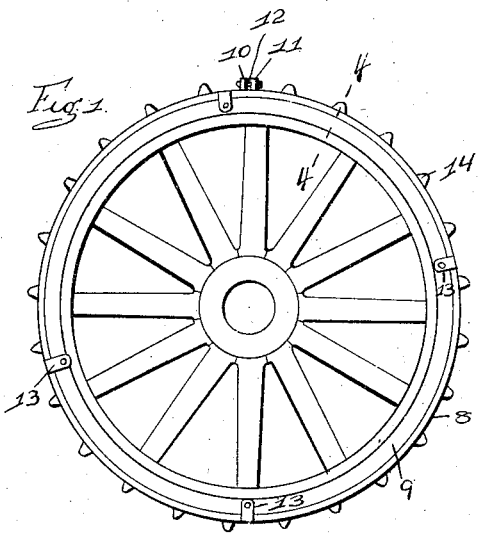
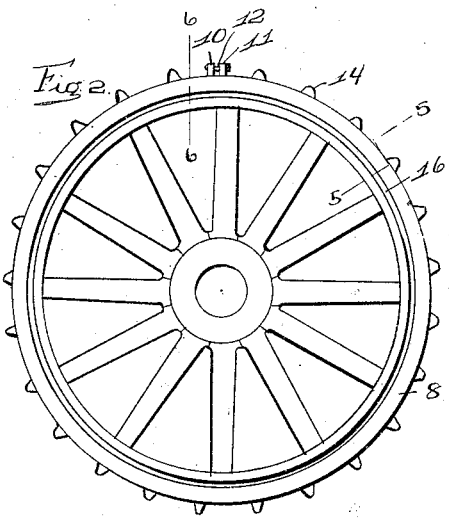
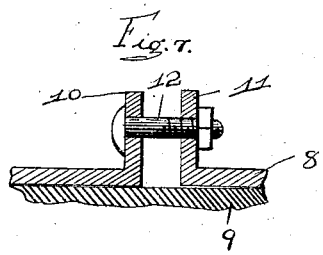
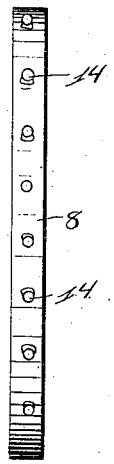
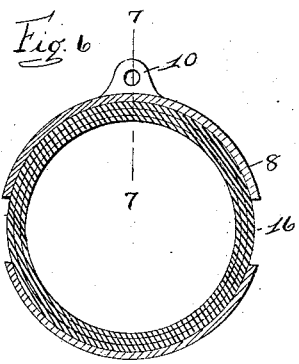
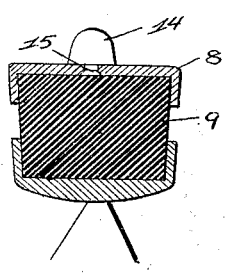
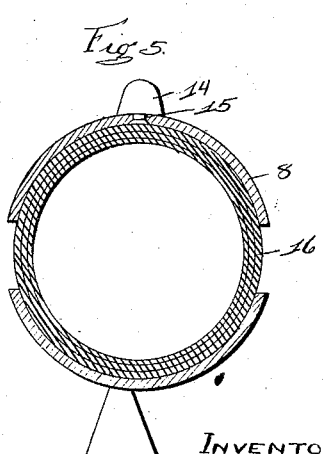
WITNESSES:
Edw M Harrington
INVENTOR:
George Adams
By Higdon Longan & Hopkins
attys.

UNITED STATES PATENT OFFICE.

GEORGE ADAMS, OF ST. LOUIS, MISSOURI.

TRACTION ATTACHMENT FOR AUTOMOBILE-WHEELS.

No. 820,691.  Specification of Letters Patent.  Patented May 15, 1906.

Application filed January 26, 1905. Serial No. 242,809.

*To all whom it may concern:*

Be it known that I, GEORGE ADAMS, a citizen of the United States, and a resident of St. Louis, Missouri, have invented certain new and useful Improvements in Traction Attachments for Automobile-Wheels, of which the following is a specification containing a full, clear, and exact description, reference being had to the accompanying drawings, forming a part hereof.

My invention relates to improvements in traction attachments for automobile-wheels; and it consists of the novel features herein shown, described, and claimed.

In the drawings, Figure 1 is an elevation of a wheel having a solid-rubber tire and my improved traction attachment applied to the tire. Fig. 2 is a view analogous to Fig. 1 and showing a round pneumatic tire. Fig. 3 is an edge view of the wheel shown in Fig. 1. Fig. 4 is a cross-section through the rim of the wheel in Fig. 1 and taken on the line 4 4. Fig. 5 is a cross-section through the rim of the wheel shown in Fig. 2 and taken on the line 5 5. Fig. 6 is a cross-section upon the line 6 6 of Fig. 2. Fig. 7 is a longitudinal section upon the line 7 7 of Fig. 6.

Referring to the drawings in detail, the flat band 8 is wide enough and long enough to cover the periphery of the flat rubber tire 9, the ends of the band being turned up to form the ears 10 and 11, and the draw-bolt 12 is inserted through the ears to tighten the band upon the tire. Flanges 13 extend from the edges of the band 8 at suitable intervals to engage the sides of the tire and hold the band in position. Teeth 14 have shanks 15 inserted through the band 8 and riveted. In the modified construction the band 8 is curved in cross-section to fit the curvature of the pneumatic tire 16. The teeth 14 and the band 8 produce a rough-shod wheel which will engage the roadway and prevent rotary slipping of the wheel and also side slipping.

My rough-shod wheels are intended principally for use as driving-wheels for heavily-loaded automobiles and wagons and the like.

I claim—

In a traction attachment for automobile-wheels, the combination with a tire, of an encircling band constructed of a single strip of material fitted to the tread of the tire and having integral portions that extend downwardly onto the sides of the tire, teeth riveted to the encircling band and projecting outwardly therefrom, a pair of perforated lugs integral with the meeting ends of the encircling band, and a draw-bolt passing through the perforated lugs; substantially as specified.

In testimony whereof I have signed my name to this specification in presence of two subscribing witnesses.

GEORGE ADAMS.

Witnesses:
ALFRED A. EICKS,
JOHN C. HIGDON.